(12) United States Patent
Spector et al.

(10) Patent No.: US 12,387,464 B2
(45) Date of Patent: Aug. 12, 2025

(54) DEVICE AND METHOD FOR TRAINING A NEURAL NETWORK FOR CONTROLLING A ROBOT FOR AN INSERTING TASK

(71) Applicant: Robert Bosch GmbH, Stuttgart (DE)

(72) Inventors: Oren Spector, Modiin Maccabim Reut (IL); Dotan Di Castro, Haifa (IL)

(73) Assignee: ROBERT BOSCH GMBH, Stuttgart (DE)

(*) Notice: Subject to any disclaimer, the term of this patent is extended or adjusted under 35 U.S.C. 154(b) by 310 days.

(21) Appl. No.: 17/654,742

(22) Filed: Mar. 14, 2022

(65) Prior Publication Data
US 2022/0335710 A1  Oct. 20, 2022

(30) Foreign Application Priority Data

Apr. 14, 2021 (DE) ...................... 10 2021 109 333.3

(51) Int. Cl.
*A61G 5/04* (2013.01)
*A61G 5/10* (2006.01)
(Continued)

(52) U.S. Cl.
CPC ............ *G06V 10/774* (2022.01); *B25J 9/161* (2013.01); *B25J 9/1633* (2013.01); *B25J 9/1687* (2013.01); *B25J 9/1697* (2013.01); *B25J 13/08* (2013.01); *G06T 7/20* (2013.01); *G06T 7/70* (2017.01); *G05B 2219/32335* (2013.01);
(Continued)

(58) Field of Classification Search
CPC . B25J 9/161; B25J 13/08; B25J 9/1633; B25J 9/163; B25J 9/1687; B25J 9/1697; G05B 2219/40032; G05B 2219/39271; G05B 2219/32335; G05B 2219/39001; G05B 2219/39391; G05B 2219/40532; G05B 2219/40584; G05B 2219/40609; G06T 2207/20081; G06T 7/70;
(Continued)

(56) References Cited

U.S. PATENT DOCUMENTS

2017/0252922 A1* 9/2017 Levine .................. B25J 9/1612
2019/0184570 A1* 6/2019 Yung ....................... B25J 9/163
(Continued)

FOREIGN PATENT DOCUMENTS

DE  102017117928 A1  2/2018
DE  102017011361 A1  6/2018
(Continued)

*Primary Examiner* — Adam R Mott
*Assistant Examiner* — Ricardo I Viscarra
(74) *Attorney, Agent, or Firm* — NORTON ROSE FULBRIGHT US LLP

(57) ABSTRACT

A method for training a neural network to derive, from an image of a camera mounted on a robot, a movement vector for the robot to insert an object into an insertion. The method includes controlling the robot to hold the object, bringing the robot into a target position in which the object is inserted in the insertion, for a plurality of positions different from the target position controlling the robot to move away from the target position to the position, taking a camera image by the camera and labelling the camera image by a movement vector to move back from the position to the target position and training the neural network using the labelled camera images.

8 Claims, 5 Drawing Sheets

(51) Int. Cl.
    *B25J 9/16*      (2006.01)
    *B25J 13/08*     (2006.01)
    *G06T 7/20*      (2017.01)
    *G06T 7/70*      (2017.01)
    *G06V 10/774*    (2022.01)

(52) U.S. Cl.
    CPC .............. *G05B 2219/39001* (2013.01); *G06T 2207/20081* (2013.01); *G06T 2207/20084* (2013.01)

(58) Field of Classification Search
    CPC ............ G06T 2207/20084; G06T 7/20; G06V 10/774; G06V 10/82; G06V 2201/06
    See application file for complete search history.

(56) References Cited

U.S. PATENT DOCUMENTS

| | | | |
|---|---|---|---|
| 2020/0023520 A1* | 1/2020 | Yoshizumi | B25J 9/1687 |
| 2020/0030970 A1* | 1/2020 | Mariyama | B25J 9/1697 |
| 2020/0086437 A1* | 3/2020 | Johnson | B25J 9/1664 |
| 2020/0086483 A1* | 3/2020 | Li | B25J 9/1653 |
| 2021/0049754 A1* | 2/2021 | Ortega | G06F 18/214 |
| 2021/0078167 A1* | 3/2021 | Khansari Zadeh | G06T 7/90 |
| 2022/0016766 A1* | 1/2022 | Humayun | G06T 7/73 |
| 2022/0305645 A1* | 9/2022 | Nikovski | B25J 9/1648 |

FOREIGN PATENT DOCUMENTS

| | | |
|---|---|---|
| DE | 102020100316 A1 | 7/2020 |
| DE | 102020000964 A1 | 8/2020 |
| DE | 102019203821 B3 | 9/2020 |
| DE | 102020115631 A1 | 12/2020 |
| DE | 102020115658 A1 | 12/2020 |
| DE | 112019002310 T5 | 2/2021 |
| DE | 102020212461 A1 | 4/2021 |
| DE | 102021103272 A1 | 8/2021 |

* cited by examiner

DEVICE AND METHOD FOR TRAINING A NEURAL NETWORK FOR CONTROLLING A ROBOT FOR AN INSERTING TASK

CROSS REFERENCE

The present application claims the benefit under 35 U.S.C. § 119 of German Patent Application No. DE 10 2021 109 333.3 filed on Apr. 14, 2021, which is expressly incorporated herein by reference in its entirety.

FIELD

The present invention relates to devices, and methods for training a neural network for controlling a robot for an inserting task.

BACKGROUND INFORMATION

Assembly such as electrical wiring assembly is one of the most common manual labour jobs in industry. Examples are electrical panel assembly and in-house switchgear assembly. Complicated assembly processes can typically be described as a sequence of two main activities: grasping and insertion. Similar tasks occur for example in cable manufacturing which typically includes cable insertion for validation and verification.

While for grasping tasks, suitable robot control schemes are typically available in industry, performing insertion or "peg-in-hole" tasks by robots is typically still only applicable to small subsets of problems, mainly ones involving simple shapes in fixed locations and in which the variations are not taken into consideration. Moreover, existing visual techniques are slow, typically about three times slower than human operators. Therefore, efficient methods for training a controller for a robot to perform an inserting task are desirable.

SUMMARY

According to various embodiments of the present invention, a method for training a neural network to derive, from an image of a camera mounted on a robot, a movement vector for the robot to insert an object into an insertion, is provided, wherein the method comprises controlling the robot to hold the object, bringing the robot into a target position in which the object is inserted in the insertion, for a plurality of positions different from the target position controlling the robot to move away from the target position to the position, taking a camera image by the camera and labelling the camera image by a movement vector to move back from the position to the target position and training the neural network using the labelled camera images.

Since when moving back from the target position, the path can be recorded, the method described above allows easy generation of the labels for the training data images. Further, The target position gives a reliable reference.

The movement vector may for example be a vector of the differences between the pose of the current position (position at which camera image is taken) and the pose of the target position (e.g. in terms of Cartesian coordinates for the position and angles for the orientation).

Various embodiments of the method described above allow a training of a robot for an inserting task for which training data may be easily collected and which allows generalizing to variations in the control environment or control scenario such as error in grasping (misaligned grasping) of the object to be inserted, different location or orientation than in the collected training data, different colours, small differences in shape. In particular, danger to the robot or its surroundings while collecting data can be avoided and learning may be performed done offline. Further, the approach of the method described above is scalable to many different inserting problems (including peg-in-hole and threading problems). The above is in particular achieved by formulating the correction of grasping error (or general the correction of a position in an inserting task) as a regression task for a neural network as a neural network can capture very complex structured environments while it remains easy to collect data.

Various Examples are given in the following.

Example 1 is a method for training a neural network as described above.

Example 2 is the method of Example 1, further comprising generating, for at least one of the camera images, an additional camera image by at least one of colour jitter, conversion to grey scale, cropping, shifting and filtering of the camera image, labelling the additional camera image with the movement vector with which the camera image is labelled and training the neural network using the labelled additional camera image.

In other words, an augmentation of training data images may be performed. This improves the capability of the neural network to generalize, e.g. over different forms or colours of plugs etc.

Example 3 is the method of Example 1 or 2, wherein the positions are positions in which the object touches a plane in which the insertion is located and wherein the movement vector specifies the movement parallel to the plane in which the insertion is located.

In this manner, a reference is created in the training data elements, because the insertion and the part of the object touching the plane (e.g. tip of a pin of a plug) are on the same level (e.g. in terms of the z coordinate in an end-effector coordinate system). This reference avoids ambiguities in the regression task performed by the neural network.

Example 4 is the method of Example 3, further comprising, for each position of the plurality of positions, measuring a force and a moment exerted onto the object, forming a training data element comprising the camera image, the measured force and moment and the movement vector to move back from the position to the target position as label, wherein the method comprises training the neural network using the training data elements.

Taking into account force measurements in the regression provides additional information which allows improving the regression result.

Example 5 is the method of Example 4, further comprising generating, for at least one of the training data elements, an additional training data element by random scaling the pair of force and moment by a random number between zero and a predetermined positive limit and training the neural network using the additional training data element.

This prevents overfitting to different forces that the robot applies to the object.

Example 6 is a method for controlling a robot to insert an object into an insertion comprising controlling the robot to hold the object, generating an estimate of a target position to insert the object into the insertion, controlling the robot to move to the estimated target position, taking a camera image using the camera after having controlled the robot to move to the estimated target position, feeding the camera image to the neural network trained according to any one of Examples 1 to 5 and controlling the robot to move according to the movement vector derived by the neural network from the camera image.

Example 7 is a robot, comprising a camera mounted on the robot adapted to provide camera images and a controller configured to implement a neural network and configured to carry out the method of any one of Examples 1 to 6.

Example 8 is a computer program comprising instructions which, when executed by a processor, makes the processor perform a method according to any one of Examples 1 to 6.

Example 9 is a computer readable medium storing instructions which, when executed by a processor, makes the processor perform a method according to any one of Examples 1 to 6.

In the figures, similar reference characters generally refer to the same parts throughout the different views. The figures are not necessarily to scale, emphasis instead generally being placed upon illustrating the principles of the present invention. In the following description, various aspects of the present invention are described with reference to the following figures.

DETAILED DESCRIPTION OF EXAMPLE EMBODIMENTS

The following detailed description refers to the accompanying figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

Figure 1:
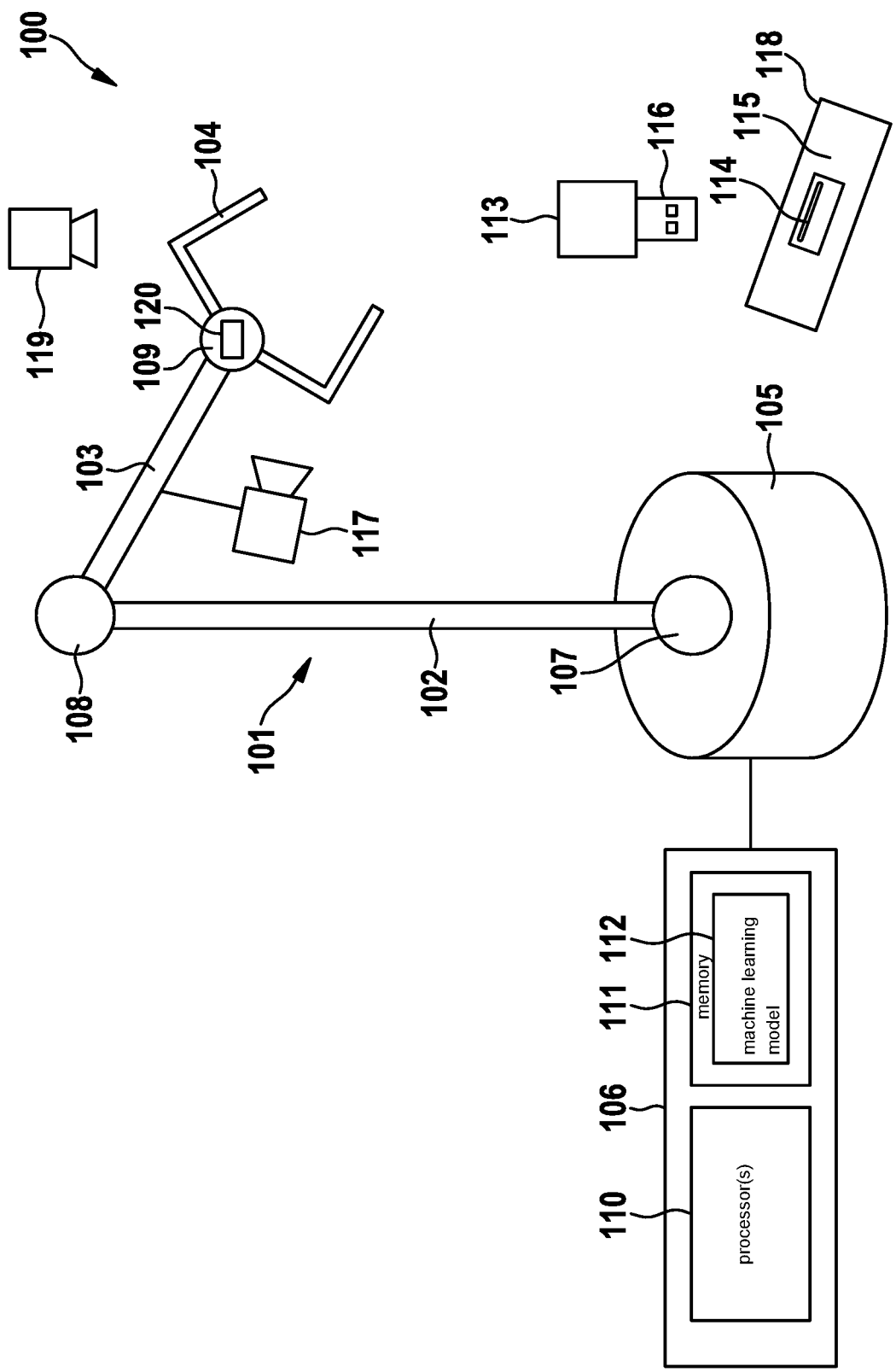
FIG. 1 shows a robot, in accordance with an example embodiment of the present invention.

In the following, various examples will be described in more detail. FIG. 1 shows a robot 100.

The robot 100 includes a robot arm 101, for example an industrial robot arm for handling or assembling a work piece (or one or more other objects). The robot arm 101 includes manipulators 102, 103, 104 and a base (or support) 105 by which the manipulators 102, 103, 104 are supported. The term "manipulator" refers to the movable members of the robot arm 101, the actuation of which enables physical interaction with the environment, e.g. to carry out a task. For control, the robot 100 includes a (robot) controller 106 configured to implement the interaction with the environment according to a control program. The last member 104 (furthest from the support 105) of the manipulators 102, 103, 104 is also referred to as the end-effector 104 and may include one or more tools such as a welding torch, gripping instrument, painting equipment, or the like.

The other manipulators 102, 103 (closer to the support 105) may form a positioning device such that, together with the end-effector 104, the robot arm 101 with the end-effector 104 at its end is provided. The robot arm 101 is a mechanical arm that can provide similar functions as a human arm (possibly with a tool at its end).

The robot arm 101 may include joint elements 107, 108, 109 interconnecting the manipulators 102, 103, 104 with each other and with the support 105. A joint element 107, 108, 109 may have one or more joints, each of which may provide rotatable motion (i.e. rotational motion) and/or translatory motion (i.e. displacement) to associated manipulators relative to each other. The movement of the manipulators 102, 103, 104 may be initiated by means of actuators controlled by the controller 106.

The term "actuator" may be understood as a component adapted to affect a mechanism or process in response to be driven. The actuator can implement instructions issued by the controller 106 (the so-called activation) into mechanical movements. The actuator, e.g. an electromechanical converter, may be configured to convert electrical energy into mechanical energy in response to driving.

The term "controller" may be understood as any type of logic implementing entity, which may include, for example, a circuit and/or a processor capable of executing software stored in a storage medium, firmware, or a combination thereof, and which can issue instructions, e.g. to an actuator in the present example. The controller may be configured, for example, by program code (e.g., software) to control the operation of a system, a robot in the present example.

In the present example, the controller 106 includes one or more processors 110 and a memory 111 storing code and data based on which the processor 110 controls the robot arm 101. According to various embodiments, the controller 106 controls the robot arm 101 on the basis of a machine learning model 112 stored in the memory 111.

According to various embodiments, the machine learning model 112 is configured and trained to allow the robot 100 to perform an inserting (e.g. peg-in-hole) task, for example inserting a plug 113 in a corresponding socket 114. For this, the controller 106 takes pictures of the plug 113 and socket 114 by means of cameras 117, 119. The plug 113 is for example a USB (Universal Serial Bus) plug or may also be a power plug. It should be noted that if the plug has multiple pegs like a power plug, then each peg may be regarded as object to be inserted (wherein the insertion is a corresponding hole). Alternatively, the whole plug may be seen as the object to be inserted (wherein the insertion is a power socket). It should be noted that (depending on what is regarded as the object) the object 113 is not necessarily completely inserted in the insertion. Like in case of the USB plug, the USB plug is considered to be inserted if the metal contact part 116 is inserted in the socket 114.

Robot control to perform a peg-in-hole task typically involves two main phases: searching and inserting. During searching, the socket 114 is identified and localized to provide the essential information required for inserting the plug 113.

Searching an insertion may be based on vision or on blind strategies involving, for example, spiral paths. Visual techniques depend greatly on the location of the camera 117, 119 and the board 118 (in which the socket 114 is placed) and obstructions, and are typically about three times slower than human operators. Due to the limitations of visual methods, the controller 106 may take into account force-torque and haptic feedback, either exclusively or in combination with vision.

This in particular allows generalization, for example between cylindrical and cuboid pegs.

Controlling a robot to perform an inserting task may also involve contact model-based control or contact model-free learning. Model-based strategies estimate the state of the assembly from the measured forces, torques and position, and correct the movement accordingly using state-dependent pre-programmed compliant control. Model-free learning involves learning from demonstration (LfD) or learning from the environment (LfE). LfD algorithms derive a policy from a set of examples or demonstrations provided by expert operators. The flexibility of the resulting policy is limited by the information provided in the demonstration data set.

Reinforcement learning (RL) approaches (e.g. combining a pre trained base policy (using Lfd or pre designed base controller) and a learned residual policy by interacting with the environment) may manage to solve some complicated inserting problems and even generalize to some extent. However, the flexibility and scalability of online RL remains limited as an online learning scheme. Namely, in this case, having the robot interact with the environment with the latest learned policy to acquire more knowledge on the environment and to improve the policy is impractical, because data collection is expensive (need to collect trajectories on real robot) and dangerous (robot safety and its surrounding). The data collection aspect is highly important as generalization in machine learning is associated with the quality and size of the trained data.

In view of the above, according to various embodiments, a regression approach is provided which is applicable to a wide range of inserting problems. Experiments show that it allows to achieve close to perfect results on wide range of plugs and pegs with only 50-100 data points collected (which can be learned within few minutes). Those data points can be collected without a need of a preview learned policy and can be collected on some remote offline location. In addition, it can be shown to generalize over location and over closely related scenarios such as in terms of different size, shapes and colour than in the collected data.

Assembly tasks usually involve a sequence of two basic tasks: pick-and-place and peg-in-hole (insertion). In the following, pick and place and in particular the training and control for the ability to grasp an object is not described since it is assumed that a corresponding control is available or that the location and grasp of the object (e.g. plug 113) is pre-defined by the user. The approach described in the following can handle uncertainties (undesired misaligned grasping) in the grasping location and angle (typically to an extent of up to 10 degrees). An automatic conveyor is one practical way to reduce undesired misaligned grasping.

To facilitate generalization (and for being able to apply a regression approach) the control procedure performed by the controller 106 to control the robot arm 101 to insert the object 113 in the insertion 114 is divided into two stages. The first stage (localization stage) is a rough localization and planning part. For this, the controller 106 uses a further (e.g. horizontal) camera 119 to localize the insertion 114. The localization is a rough localization and its error depends on the location and type of the horizontal camera 119.

The second stage (correction stage) is a correction of the position in accordance with a residual policy. The need for a correction comes on the fact that uncertainties in the location and orientation of the insertion 114 are inevitable due to localization grasping and control tracking errors.

According to various embodiments, a machine learning model 112 in the form of a neural network is trained to provide a movement vector to correct the position. This means that the neural network is trained to perform regression. The neural network 112 operates on pictures taken by a robot-mounted camera 117 which is directed with a certain angle (e.g. 45 degrees) onto the end-effector 104 such that images taken by it shows the object 113 held by the end-effector 104. For example, the camera 117 is a wrist camera located in 45 degrees (from the robot wrist, e.g. with respect to an end-effector z axis) such that the centre of the image is pointed between the fingers of the end-effector 104. This allows avoiding concealment.

An image taken by the robot-mounted camera 117 is one of the inputs of the neural network 112.

Figure 2:
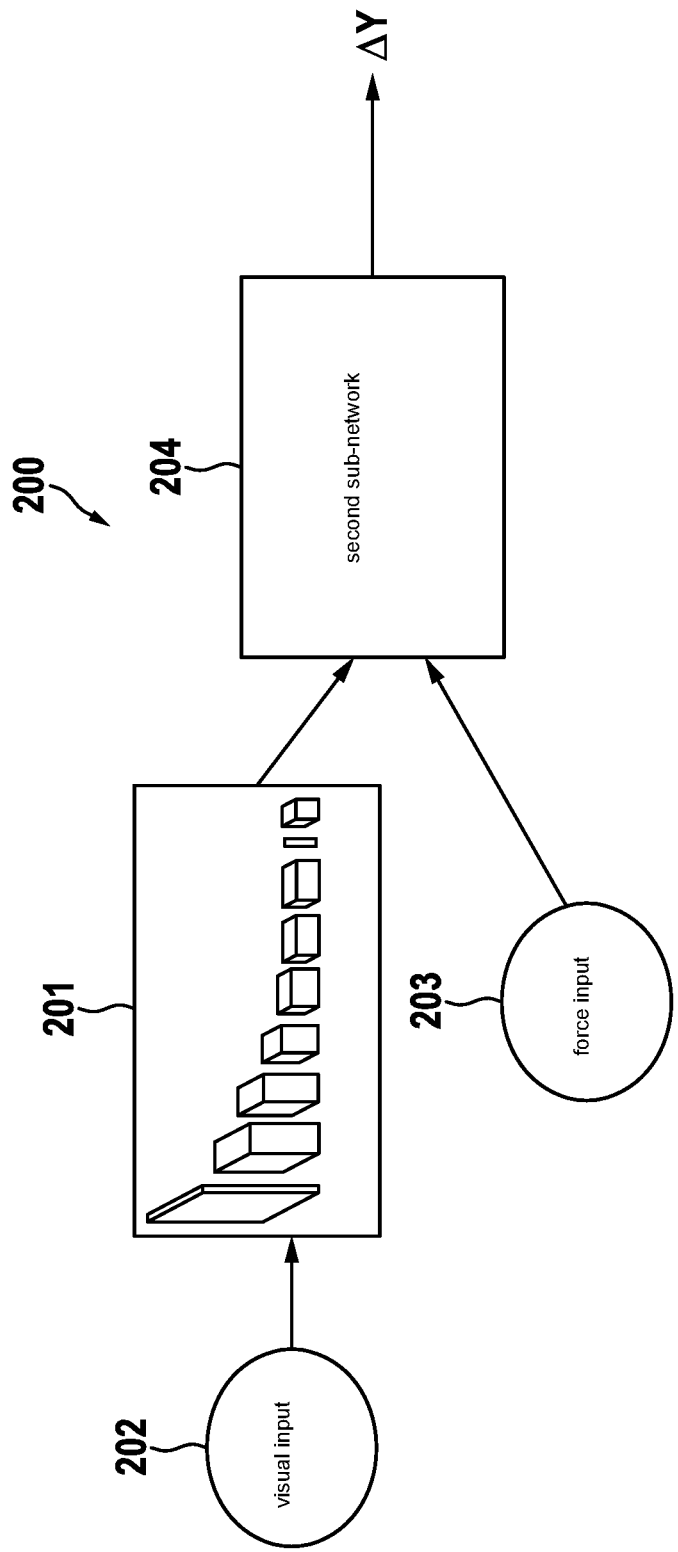
FIG. 2 shows a neural network according to an example embodiment of the present invention.

FIG. 2 shows a neural network 200 according to an embodiment.

The neural network 200 performs a regression task. It includes a first sub-network 201 which receives visual input 202, e.g. an image provided by the robot-mounted camera 117. The first sub-network 201 is a convolutional network (e.g. according to YOLO Lite). Its output is given to a second sub-network 204 of the neural network 200. The second sub-network 204 receives force input 203, i.e. measurements of a force sensor 120 which measures a moment and force experienced by the object 113 when held by the end-effector and pressed by the robot on a plane (e.g. the surface 115 of the board 118). The force measurement can be taken by the robot or by an external force and torque sensor.

The usage of both visual input 202 and force input 203 makes the approach applicable to many different kinds of inserting tasks.

The second sub-network 204 (e.g. having fully-connected layers) uses a shared representation of visual and force information (e.g. generated by concatenation of the output of the first sub-network 201 and the force input 203). Its output is a movement vector (here referred to as $\Delta Y$) representing a delta action the robot should apply in the end-effector coordinate system. The movement vector may for example comprise a translation vector in the x-y-plane of the end-effector coordinate system. It should be noted that the movement vector may not only comprise translational components but may also comprise angles specifying how the robot arm 101 should be turned to correct the orientation of the object 113 to insert it into the insertion 114.

Using a delta action as an output while not stating the location of the end-effector (to the neural network) leads to a scheme where the neural network is agnostic to location and rotation. For example, turning the board 118 and the end-effector 104 by ninety degrees in the horizontal plane has no effect on the input data and the output data of the neural network 200. This allows keeping the neural network 200 simple.

If the end-effector location was needed for specifying the correction action of the correction stage, training the neural network 200 would not generalize to other board location while using the end-effector coordinate system allows making the neural network agnostic to the board rotation.

To collect training data for the neural network 200 (in particular to find the right actions, i.e. movement vectors that should be output by the neural network 200) insertion location and orientation are first determined and saved. After saving the insertion location training data for the regression model can be collected as obs:{camera image, force}
action in end-effector coordinate system:{hole previews saved location-current location}.

This means that generating training data elements for training the neural network 200 comprises Determine insertion location
Collect camera image, force measurement and current location (for a training location)
Form training data element as input (observation) given by {image, force} and label (action in end-effector space) given by {insertion location–current location}, i.e. the difference vector between insertion location and current location As mentioned above the, the label may further comprise one or more angles for correcting the orientation, i.e. the difference between the insertion orientation and the current orientation. In that case, also the current orientation is collected.

Using training data elements generated in this way the neural network 200 is trained using supervised training. The training may be performed by the controller 106 or the neural network 200 may be trained externally and loaded into the controller 106.

In operation, in the correction stage (i.e. the second stage), the controller 106 takes an image using the wrist-mounted camera 107, feeds it to the trained neural network 200 and controls the robot according to the output of the trained neural network 200, which is a movement vector specifying where to move from the current position (which results from the first stage) and possibly how to change the orientation of the object 113 for inserting the object 113 into the insertion. This means that the controller 106 performs a controlling action specified by the output of the neural network 200. As explained above, the position resulting from the first stage needs typically to be corrected due to localization grasping and control tracking errors.

According to various embodiments, the images taken by the camera 107 (both for training as well as in operation) are taken when the insertion (i.e. specifically the opening of the insertion) and the tip of the object which is to inserted into the insertion first are on the same plane.

Figure 3:
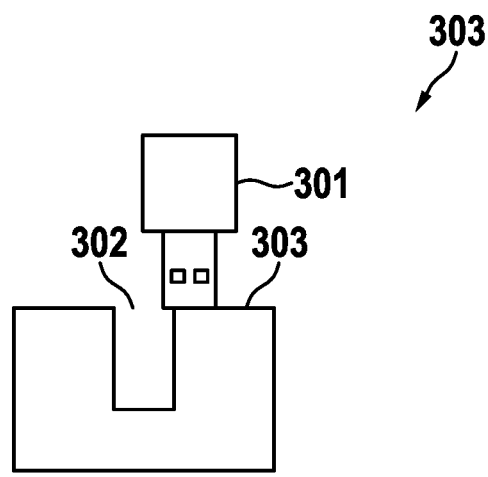
FIG. 3 shows an example of a configuration in which the controller takes an image with the robot-mounted camera for training or in operation, in accordance with the present invention.

FIG. 3 shows an example of a configuration in which the controller 106 takes an image with the robot-mounted camera 107 for training or in operation.

In this example, as in the illustration of FIG. 1, the object is a USB plug 301 and the insertion is a USB socket 302 (shown in cross section). The controller 106 takes a photo by means of the robot-mounted camera 107 when, as shown, the tip of the plug 301 (which is to go into the socket 302 first), touches the surface 303 in which the insertion is formed (e.g. the board surface).

In the example of a power plug, the surface 303 is for example the surface in which the holes of for the pegs are located (i.e. the bottom surface of the opening for receiving the plastic casing). This assumes that the accuracy of the first stage is high enough such that the pegs touch that surface (i.e. are located in that opening).

Using a wrist camera to evaluate delta distance to the needed location is complicated when as the pin of the tip of the socket and the opening of the insertion are in a different plane since the distance between plug 301 and socket 302 parallel to the surface 303 shown in a camera image may be the same for different distances between plug 301 and socket 302 perpendicular to the surface 303 and thus for different actual distances between plug 301 and socket 302 due to the cameras image cone (like if regarding two pencils next to each other with one eye closed and moving one pencil back and forth). The relation between distance shown in a camera image and actual distances becomes even more complicated when the wrist camera 107 is placed in an angle, as it is the case according to various embodiments to avoid occlusion. This issue can be addressed by obtaining camera images only if the plug 301 touches the surface 303. The controller 106 may detect that the plug 301 touches the surface 303 by means of the force sensor 120: if the force sensor detects a force exerted on the plug 113 directed away from the surface 303 of the board 118, the plug 113 touches the surface 303 of the board 118.

In this particular situation the contact(s) e.g. pin or pins of the plug and the socket hole or holes are in the same plane and the neural network 200 (trained using camera images when this condition holds) can calculate the distance between the current position of the plug 301 to the socket 302 from a camera image (taken when this condition holds).

According to various embodiments, the training data images (i.e. the camera images taken for the training data elements) are collected in a backward learning manner. This means that the robot is controlled to hold the object 113 (e.g. gripper closed) and brought into a position such that the object 113 is inserted in the insertion 114. From this position, the robot is controlled to go up (i.e. into z direction in the end-effector coordinate system) adding a random error (e.g. 10 mm and 20 degree, which is sufficient for most applications) similar to the uncertainties in the system (grasping and localization errors). After going up the robot is controlled to go down until the force sensor 102 senses a force exerted onto the object 113 or a location error (anomaly) is detected. Then, the robot-mounted camera 117 is controlled to obtain an image and Obs:{camera image, force} and movement vector (difference vector between insertion location and current location in end-effector coordinate system) are recorded as training data element as explained above.

According to various embodiments, data augmentation is performed for the training data to enhance generalization.

Regarding the collected training data images, it is desirable that the correction stage (in particular the neural network 200) is agnostic to closely related scenarios such as in different colours and different shapes of plugs and sockets (e.g. power plugs with different housings and colours). Generalization over shapes is typically difficult as form influences the camera position when the camera image is taken as for example the power plug pegs may be longer or shorter. Examples for augmentations on training data images (i.e. how one or more additional training data images may be generated from a recorded training data image) are:

Random colour jitter 50% of the training data image (for generalization over brightness and colour)
Random grey scale 50% of the training data image—(for generalization over colour)
Crop training data image (for generalization over shifts in the camera position created because of different shape or grasping errors)
Shift training data image (for generalization over shifts in the camera position created because of different shapes or grasping errors)
Random convolution (for adding overall robustness)

The label (movement vector) for an additional training data image generated in this manner from a recorded training data image is set to the same as for the recorded training data image.

According to various embodiments, training data augmentation is also done for the force measurement. This means that from a training data element one or more additional training data elements are generated by altering the force information (used as force input 203 when training the neural network 200 with the training data element). The force information for example comprises a force experienced in end-effector z direction by the object 113 and a moment experienced by the object 113.

Figure 4:
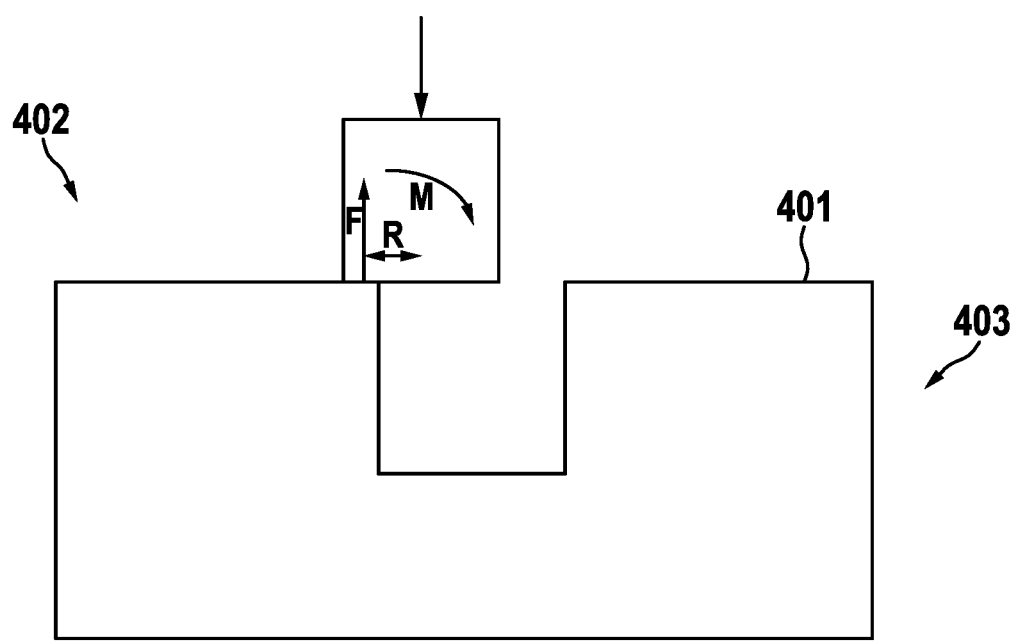
FIG. 4 illustrates force and moment experienced by an object.

FIG. 4 illustrates force and moment experienced by an object 401.

Similarly to FIG. 3, the object 401 is to be inserted in an insertion 402 and touches the surface 403. The robot arm 101 holding the object 401 exerts a force 404 onto the object 401 in the direction of the surface 403. The object 401 experiences a corresponding reactive force 405. Furthermore, since the object 401 is at the edge of the insertion 402, the force 404 causes a moment 406. The reactive force 405 and the moment 406 are for example measured by the sensor 120 and used as force information (i.e. force input 203 for the neural network 200 in training and in operation).

The reactive force 406 and the moment 406 depend on the force 404. This dependency may result in overfitting. It can be seen that the real valuable information is not the magnitude of pair (F, M), i.e. the pair of reactive force 405 and moment 406, but their ratio, which specifies the distance R between the point of action of the reactive force 405 and the centre of the object 401.

In order to avoid over fitting force moment augmentation for a pair (F, M) in a training data element is performed as follows $$(F,M)' = \alpha(F,M)$$

where $\alpha$ is randomly sampled (e.g. uniformly) from the interval [0, k] where k is a predetermined upper limit.

(F, M)' is used as force information for an additional training data element. (F, M), i.e. the force information of the original training data element, is for example determined by measurement.

Figure 5:
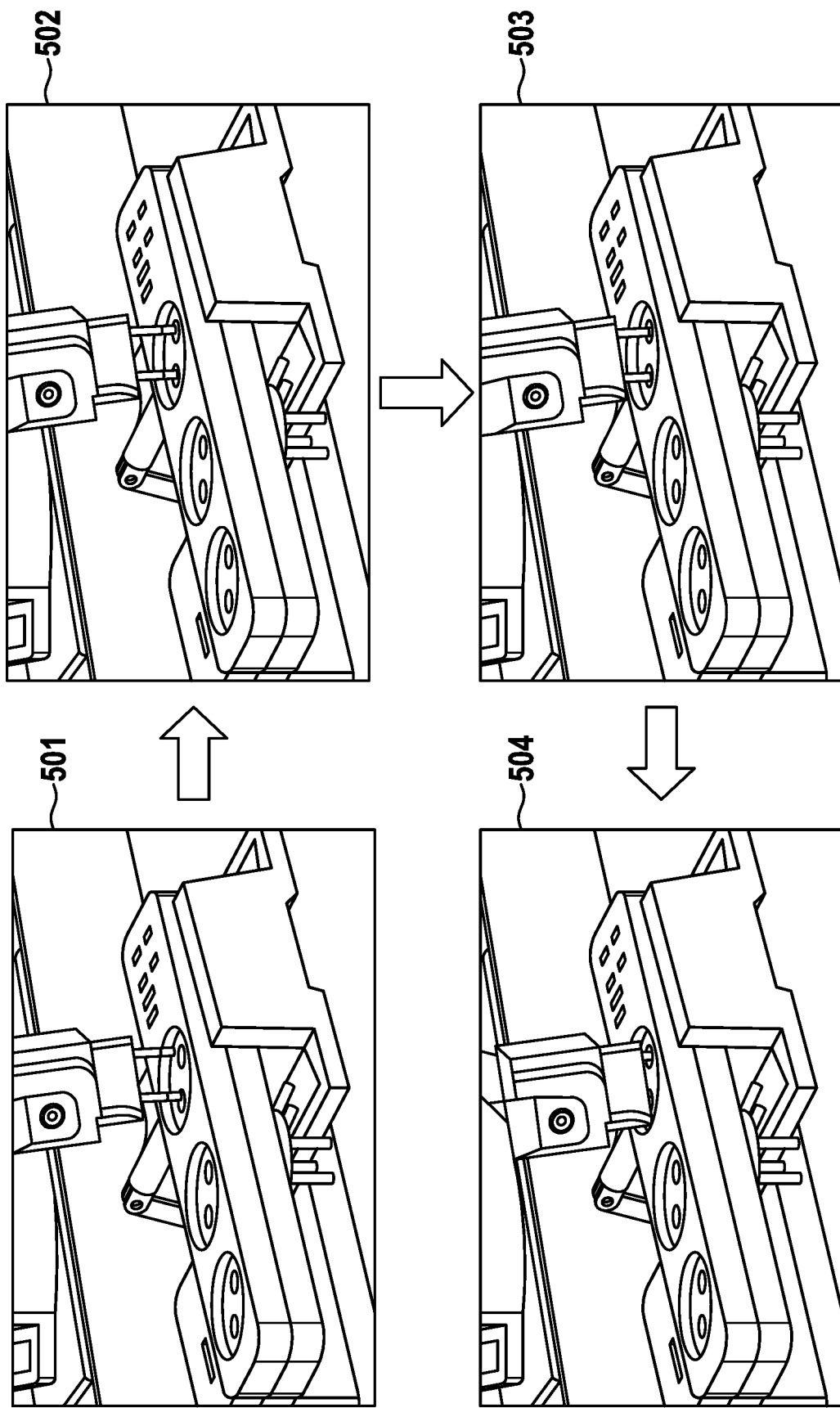
FIG. 5 illustrates operation according to an example embodiment of the present invention for inserting an electric plug into an insertion.

FIG. 5 illustrates operation according to an embodiment for an electric plug.

The controller 106 first records a picture with the horizontal camera 119. It then performs (first stage) a rough localization of the holes (e.g. using a closed loop orb algorithm) and plans a corresponding movement.

Using for example PD control the controller 106 executes the plan to try to reach the location of the holes (pictures 501, 502, 503).

The pegs are then in the opening of the socket but not yet in the holes (FIG. 503) due to various errors as explained above. The controller detects this by force measurement since the plug (and thus the end-effector) experiences a force.

The controller 106 measures force and takes a picture with the robot-mounted camera 117, feeds them to the trained neural network 112 and controls the robot as specified by the movement vector output by the neural network 112. The robot all the time pushes in direction of the insertion plane (downward z direction in end-effector coordinate system) such that it eventually pushes the plug into the socket when the robot has finished the movement according to the movement vector (picture 504).

Figure 6:
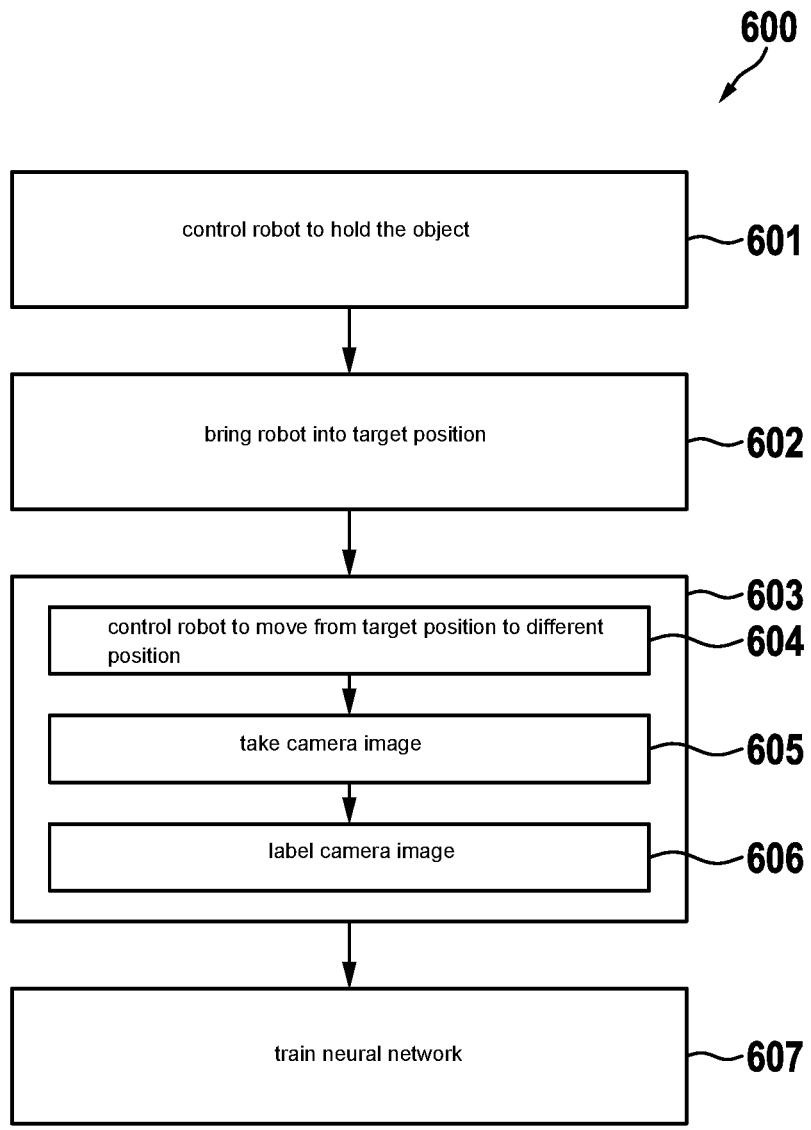
FIG. 6 shows a flow diagram for a method for training a neural network to derive, from an image of a camera mounted on a robot, a movement vector for the robot to insert an object into an insertion, according to an example embodiment of the present invention.

In summary, according to various embodiments, a method is provided as illustrated in FIG. 6.

FIG. 6 shows a flow diagram 600 for a method for training a neural network to derive, from an image of a camera mounted on a robot, a movement vector for the robot to insert an object into an insertion, according to an embodiment.

In 601 the robot is controlled to hold the object.

In 602, the robot is brought into a target position in which the object is inserted in the insertion.

In 603, for a plurality of positions different from the target position, the robot is controlled to move away from the target position to the position in 604, a camera image is taken by the camera 605; and the camera image is labelled by a movement vector to move back from the position to the target position in 606.

In 607, the neural network is trained using the labelled camera images.

According to various embodiments, in other words, the object being inserted in the insertion is used as starting point for generating training images. Since when moving back from the target position, the path can be recorded, the labels for the training data images may thus be easily generated. The target position gives a reliable reference.

The method of FIG. 6 may be performed by one or more computers including one or more data processing units. The term "data processing unit" can be understood as any type of entity that allows the processing of data or signals. For example, the data or signals may be treated according to at least one (i.e., one or more than one) specific function performed by the data processing unit. A data processing unit may include an analogue circuit, a digital circuit, a composite signal circuit, a logic circuit, a microprocessor, a micro controller, a central processing unit (CPU), a graphics processing unit (GPU), a digital signal processor (DSP), a programmable gate array (FPGA) integrated circuit or any combination thereof or be formed from it. Any other way of implementing the respective functions may also be understood as data processing unit or logic circuitry. It will be understood that one or more of the method steps described in detail herein may be executed (e.g., implemented) by a data processing unit through one or more specific functions performed by the data processing unit.

Various embodiments may receive and use image data from various visual sensors (cameras) such as video, radar, LiDAR, ultrasonic, thermal imaging etc. Embodiments may be used for training a machine learning system and controlling a robot, e.g. a robotic manipulators autonomously to achieve various inserting tasks under different scenarios. It should be noted that after training for an inserting task, the neural network may be trained for a new inserting task which reduces training time compared to training from scratch (transfer learning capabilities). Embodiments are in particular applicable to the control and monitoring of execution of manipulation tasks, e.g., in assembly lines.

According to one embodiment, the method is computer-implemented.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for training a neural network to derive, from an image of a camera mounted on a robot, a movement vector for the robot to insert an object into an insertion, the method comprising the following steps:
   controlling the robot to hold the object;
   bringing the robot into a target position in which the object is inserted in the insertion;

after bringing the robot into the target position, for each position of a plurality of positions different from the target position:
controlling the robot to move away from the target position to the position,
taking a camera image by the camera,
labelling the camera image by a movement vector to move back from the position to the target position and by an angle for correcting an orientation according to a difference between an insertion orientation and a current orientation,
generating, for at least one of the camera images, an additional camera image by at least one of: colour jitter, conversion to grey scale, cropping, shifting and filtering of the camera image, and
labelling the additional camera image with the movement vector with which the camera image is labelled, and
training the neural network using the labelled camera images and the labelled additional camera images.

2. The method of claim 1, wherein the positions are positions in which the object touches a plane in which the insertion is located, and wherein the movement vector specifies the movement parallel to the plane in which the insertion is located.

3. The method of claim 2, further comprising:
for each position of the plurality of positions:
measuring a force and a moment exerted onto the object;
forming a training data element including the camera image, the measured force and moment and the movement vector to move back from the position to the target position as label;
wherein the method further comprises training the neural network using the training data elements.

4. The method of claim 3, further comprising:
generating, for at least one of the training data elements, an additional training data element by random scaling the pair of force and moment by a random number between zero and a predetermined positive limit; and
training the neural network using the additional training data element.

5. A method for controlling a robot to insert an object into an insertion, comprising:
controlling the robot to hold the object;
generating an estimate of a target position to insert the object into the insertion;
controlling the robot to move to the estimated target position;
taking a camera image using a camera after having controlled the robot to move to the estimated target position;
feeding the camera image to the neural network trained by:
controlling the robot to hold the object,
bringing the robot into a first target position in which the object is inserted in the insertion,
after bringing the robot into the first target position, for each first position of a plurality of first positions different from the first target position:
controlling the robot to move away from the first target position to the first position,
taking a first camera image by the camera, and
labelling the first camera image by a movement vector to move back from the first position to the first target position and by an angle for correcting an orientation according to a difference between an insertion orientation and a current orientation,
generating, for at least one of the camera images, an additional camera image by at least one of: colour jitter, conversion to grey scale, cropping, shifting and filtering of the camera image, and
labelling the additional camera image with the movement vector with which the camera image is labelled, and
training the neural network using the labelled first camera images and the labelled additional camera images; and
controlling the robot to move according to a movement vector derived by the neural network from the camera image.

6. A robot, comprising:
a camera mounted on the robot adapted to provide camera images; and
a controller configured to implement a neural network and to control a robot to insert an object into an insertion, the controller configured to:
control the robot to hold the object;
generate an estimate of a target position to insert the object into the insertion;
control the robot to move to the estimated target position;
take a camera image using a camera after having controlled the robot to move to the estimated target position;
feed the camera image to the neural network trained by:
controlling the robot to hold the object,
bringing the robot into a first target position in which the object is inserted in the insertion,
after bringing the robot into the first target position, for each first position of a plurality of first positions different from the first target position:
controlling the robot to move away from the first target position to the first position,
taking a first camera image by the camera,
labelling the first camera image by a movement vector to move back from the first position to the first target position and by an angle for correcting an orientation according to a difference between an insertion orientation and a current orientation,
generating, for at least one of the camera images, an additional camera image by at least one of: colour jitter, conversion to grey scale, cropping, shifting and filtering of the camera image, and
labelling the additional camera image with the movement vector with which the camera image is labelled, and
training the neural network using the labelled first camera images and the labelled additional camera images; and
control the robot to move according to a movement vector derived by the neural network from the camera image.

7. A non-transitory computer readable medium on which are stored instructions for training a neural network to derive, from an image of a camera mounted on a robot, a movement vector for the robot to insert an object into an insertion, the instruction, when executed by a processor, causing the processor to perform the following steps:
controlling the robot to hold the object;
bringing the robot into a target position in which the object is inserted in the insertion;

after bringing the robot into the target position, for each position of a plurality of positions different from the target position:
- controlling the robot to move away from the target position to the position,
- taking a camera image by the camera,
- labelling the camera image by a movement vector to move back from the position to the target position and by an angle for correcting an orientation according to a difference between an insertion orientation and a current orientation,
- generating, for at least one of the camera images, an additional camera image by at least one of: colour jitter, conversion to grey scale, cropping, shifting and filtering of the camera image, and
- labelling the additional camera image with the movement vector with which the camera image is labelled, and training the neural network using the labelled camera images and the labelled additional images.

8. A non-transitory computer readable medium on which are stored instructions for controlling a robot to insert an object into an insertion, the instructions, when executed by a processor, causing the processor to perform the following steps:

controlling the robot to hold the object;
generating an estimate of a target position to insert the object into the insertion;
controlling the robot to move to the estimated target position;
taking a camera image using a camera after having controlled the robot to move to the estimated target position;
feeding the camera image to the neural network trained by:
- controlling the robot to hold the object,
- bringing the robot into a first target position in which the object is inserted in the insertion,
- after bringing the robot into the first target position, for each first position of a plurality of first positions different from the first target position:
  - controlling the robot to move away from the first target position to the first position,
  - taking a first camera image by the camera, and
  - labelling the first camera image by a movement vector to move back from the first position to the first target position and by an angle for correcting an orientation according to a difference between an insertion orientation and a current orientation,
- generating, for at least one of the camera images, an additional camera image by at least one of: colour jitter, conversion to grey scale, cropping, shifting and filtering of the camera image, and
- labelling the additional camera image with the movement vector with which the camera image is labelled, and training the neural network using the labelled first camera images and the labelled additional images; and
controlling the robot to move according to a movement vector derived by the neural network from the camera image.

* * * * *